United States Patent

Ohtsuka

[11] 3,886,542
[45] May 27, 1975

[54] DEVICE FOR MEASURING DISPLACEMENT

[75] Inventor: Minoru Ohtsuka, Tokyo, Japan

[73] Assignee: Canon Kabushiki Kaisha, Japan

[22] Filed: Nov. 7, 1972

[21] Appl. No.: 304,358

[30] Foreign Application Priority Data
Nov. 11, 1971 Japan.............................. 46-90091

[52] U.S. Cl... 340/347 AD; 235/92 GC; 235/92 MP; 235/92 V; 250/561; 324/161; 340/347 P
[51] Int. Cl....................... H03k 13/00; G06g 7/00
[58] Field of Search... 324/161; 235/92 MP, 92 CA, 235/92 V, 92 GC, 151.32; 356/27; 340/347 AD, 347 P; 250/555, 557, 561

[56] References Cited
UNITED STATES PATENTS

| | | | |
|---|---|---|---|
| 2,400,489 | 5/1946 | Dana et al..................... | 235/92 GC |
| 2,857,802 | 10/1958 | Cail.............................. | 235/92 GC |
| 3,037,420 | 6/1962 | Stade........................... | 250/561 |
| 3,170,100 | 2/1965 | Räntsch et al................. | 250/561 |
| 3,369,444 | 2/1968 | Patrignani..................... | 235/92 V |
| 3,469,257 | 9/1969 | Hoernes et al................ | 235/92 MP |
| 3,537,002 | 10/1970 | Haner et al................... | 324/161 |

Primary Examiner—Malcolm A. Morrison
Assistant Examiner—Errol A. Krass
Attorney, Agent, or Firm—McGlew and Tuttle

[57] ABSTRACT

A scale member, on which are marked plural scales having respective different pitches between their graduations, is movable past a graduation detecting position at which there are plural graduation detectors each operatively associated with a different respective scale. One scale has fine or "unit" graduations arranged successively in groups of ten, and another scale extending parallel to the first scale has coarse or "tens" graduations each corresponding to a respective group of fine graduations. Each tenth fine graduation is relatively elongated. The detectors cooperate, respectively, with the fine graduations, with the elongated fine graduations and the coarse graduations. A counter has plural digit positions, with one digit position being a "units" position and a next higher digit position being a "tens" digit position. An electronic switching circuit connects the detectors to the counter and is operable, responsive to movement of the scale bearing member past the detecting position at a relatively low speed, to supply, to the low digit position of the counter, input signals from the detector operatively associated with the scale having the fine graduations. The electronic switching circuit is operable, responsive to movement of the scale bearing member past the detecting position at a relatively higher speed, to supply, to the next higher digit position of the counter, input signals from the detector operatively associated with the coarse graduation scale. Switching between the two digit positions of the counter, responsive to a change in the speed of movement of the scale bearing member past the graduation detecting position, is effected only responsive to simultaneous detection of a relatively elongated fine graduation and the corresponding coarse graduation.

7 Claims, 9 Drawing Figures

DEVICE FOR MEASURING DISPLACEMENT

BACKGROUND OF THE INVENTION

At the present time, there are many kinds of automatically controlled machines in which sequence and servo systems are used to effect the automatic control, these machines including, for example, NC (numerical control) machine tools. The present tendency is to increase the use of such automatically controlled machines.

In case the indexing of positions is effected by the incremental method mostly used at present, a pending problem is to increase the speed of detection. However, the increase of sensitivity for detection of displacement and the increase of the speed of count, i.e., high speed movement (feed) are contradictory to each other, and under existing circumstances, machines are merely operated within some limits.

A general method for settling such a problem is to use a high speed processing system. However, there is generally a considerable disadvantage from the standpoints of noise, stability for operation and cost. Namely, in an ordinary counter, counting cannot be effected when it is speeded up, so that a high speed counter and a high speed detecting element must be used to attain high speed processing, resulting in high cost.

SUMMARY OF THE INVENTION

It is an object of the present invention to provide a high speed displacement detecting device which is useful as a displacement measuring element or a control element in machine tools, for example.

Another object of the present invention is to eliminate the disadvantages of usual machines and to speed up the displacement measurement from several times to several hundred times the speed possible with usual displacement measurement devices, by using a novel control element or system functioning, in effecting the control, in the same manner as known systems.

BRIEF DESCRIPTION OF THE DRAWINGS

FIF. 1 is a graph showing speed control at the time of locating is generally effected in NC machine tools and the like.

DESCRIPTION OF THE PREFERRED EMBODIMENTS

Figure 1:
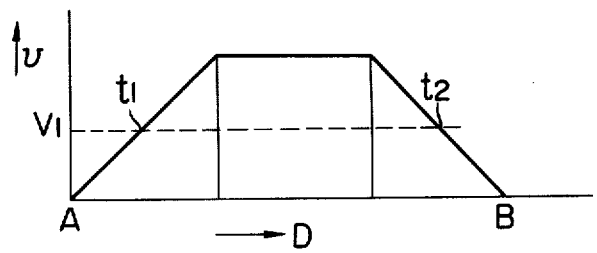

Generally, in the case of positioning in a NC machine tool or various measuring machines, the change of speed $v$, to be controlled, has approximately the characteristic curve shown in FIG. 1. Namely, tools or goods to be processed are accelerated from the beginning A of movement at a certain rate, and, approach each other, and after a constant speed is attained, the speed is later reduced at a constant rate to the end B of movement. Usually, in measuring a shifting of the amount D, it is necessary to provide a device which is able to cover uniformly all speeds during the shift, namely a device which is able to measure even the highest shifting speed.

In the present invention, however, two successively operable detection systems are used, one for low speed operation and the other for high speed operation. During acceleration, and when the speed is below the predetermined standard or constant speed $V_1$ shown in FIG. 1, the detection system for high speed operation is ineffective and the detection system for low speed operation, which reads the fine graduations of a scale, uses only this scale for measuring the displacement. At speeds above the standard speed $V_1$, the detection system for low speed operation is ineffective and the detection system for high speed operation is made effective to utilize the rough or coarse scale graduations for high speed measuring. By using such a system, capable of processing signals at low speed as well as at high speed, it is possible to accelerate up to a speed which is substantially equal to the ratio of the graduations of the fine scale to the graduations of the coarse scale.

Figure 2:
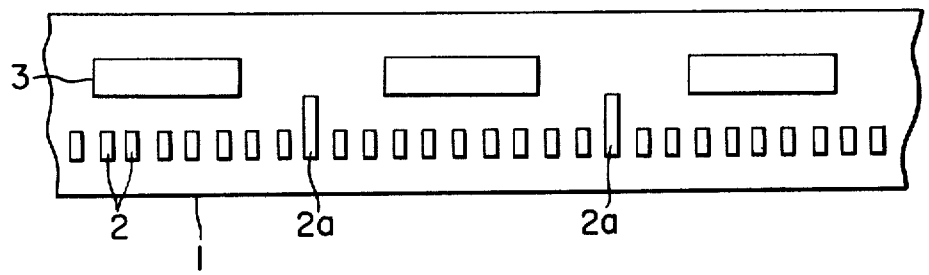
FIG. 2 is an explanatory partial elevation view showing an example of a scale used in the present invention.

FIG. 2 shows a scale used in a photoelectric method in accordance with one embodiment of the present invention, wherein the scale bearing member 1, made of transparent body, such as glass or the like, is covered with an opaque coating and transparent fine graduations 2 and rough graduations 3 are provided thereon. In the particular embodiment illustrated, the fine graduations are arranged successively in groups each including ten fine graduations 2, and every tenth graduation 2a is relatively elongated. Each group of ten fine graduations has operatively associated therewith a respective coarse graduation 3. The scale 1 is fixed on a movable portion of the tools or the goods to be processed or the like to extend in their direction of movement.

Figure 3:
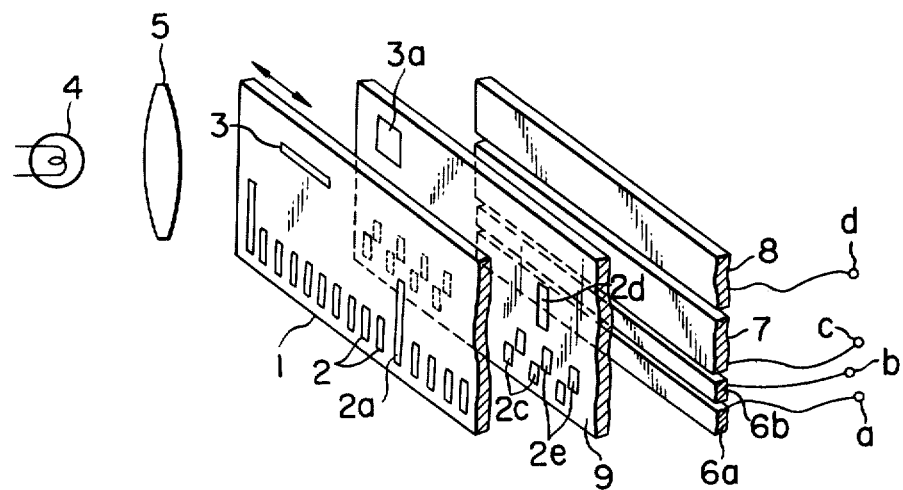
FIG. 3 is a perspective view showing the arrangement of a detection station in an embodiment of the present invention.

FIG. 3 is a perspective view showing a detecting device, wherein the light flux of a light source 4 illuminates the scale 1 through a condenser lens 5 and its light passes through a mask 9, made of glass, which has a shape similar to scale bearing member 1 and has an opaque coating thereon. Transparent portions 2c, 2e, 2d and 3a are provided in the opaque coating. The light passing through fine graduations 2, the light passing through the elongated fine graduations 2a and the light passing through the coarse graduations 3 are incident upon respective photoelectric detectors 6a and 6b, 7 and 8, so that these detectors generate respective output signals a, b, c and d of substantially sine-shape responsive to passing of the fine graduations 2, the elongated fine graduations 2a and the coarse graduations 3 past the reading position.

Figure 4:
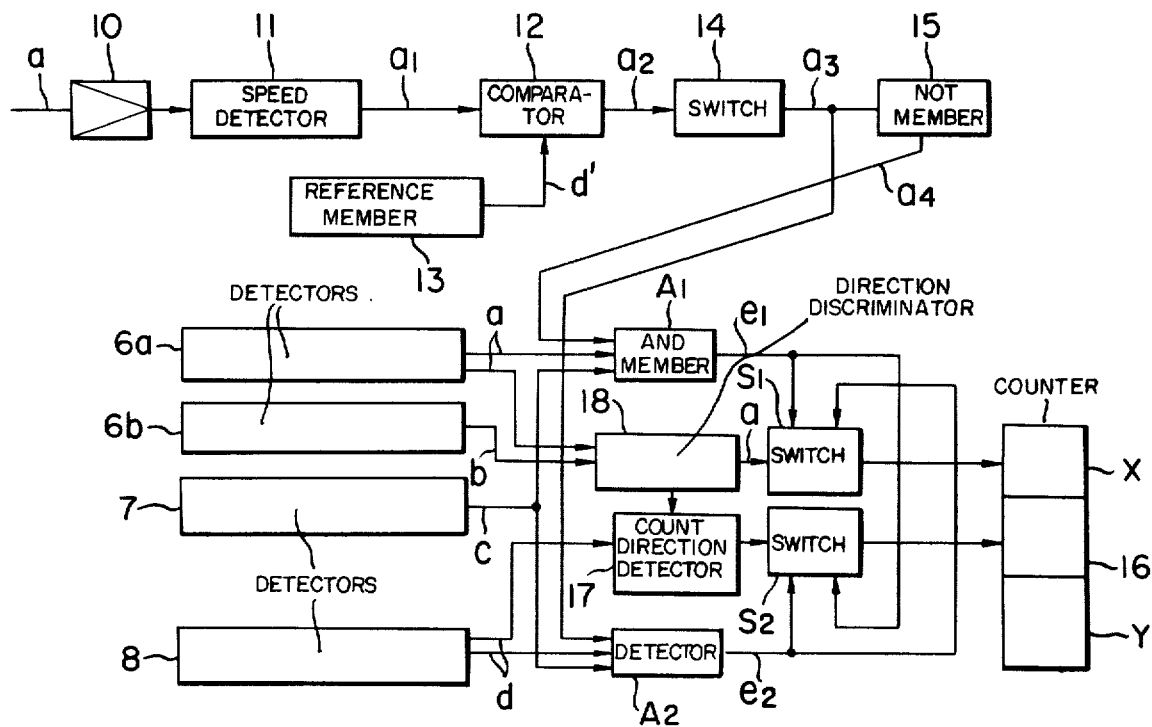
FIG. 4 is a schematic block diagram illustrating the operation of the present invention.
Figure 5:
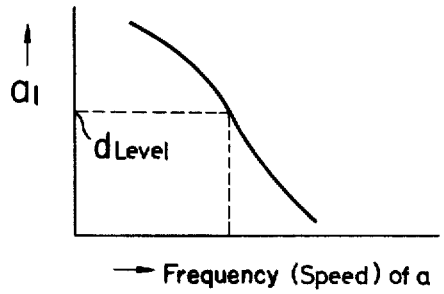
FIG. 5 is a graph showing the relation of switching speed between signals $a_1$ and $a$.

FIG. 4 shows a block diagram representing the state prior to displacement processing, wherein the output signal a of detector 6a is amplified by an amplifier 10 and fed to a speed detector 11, whose output signal $a_1$ is fed to a comparator 12 to make a decision between high speed measurement and low speed measurement. In this embodiment, such a decision is effected by comparing with an output signal $d'$ of a reference member 13, making use of the fact that the change of output due to the change of frequency of the signal a of the detector 6, for low speed, becomes as shown FIG. 5.

The output signal $a_2$ of comparator 12 is fed to a switch 14 to provide a signal $a_3$ which is 0 at low speed and 1 at high speed. The signal $a_3$ is fed to NOT member 15 to provide an opposite signal $a_4$, and signals $a_3$ and $a_4$ are fed to respective AND members $A_2$ and $A_1$.

AND members $A_1$ and $A_2$ are supplied, respectively, with the signal $a$ for low speed and the signal $d$ for high speed and are also supplied the signal $c$ provided by detector 7 for the purpose of preventing any skips in the reading of fine graduations at the time of switching from low speed operation to high speed operation and vice versa.

An output signal $e_1$ of AND member $A_1$ is operable to set a switch $S_1$ "ON" and a switch $S_2$ "OFF," and an output signal $e_2$ of AND member $A_2$ is operable to set switch $S_1$ OFF and switch $S_2$ ON.

The output signals $a$, $d$ of detectors $6a$, 8 are fed to lower digit position X and upper digit position Y of a counter 16, respectively, through respective switches $S_1$, $S_2$. For instance, the signal $a$ for low speed is fed to the lowest digit position X of the counter 16, and upper digit positions thereof may complete the carry and the signal $d$ for high speed is supplied to an arbitrary digit position (the 2nd place, in case of this embodiment), and no influence is exerted on the lower digit positions of the counter, and may complete the carry. The ratio of these upper and lower digit positions is made equal to the ratio of the signal $d$ for high speed and the signal $a$ for low speed. Block 17 is a circuit for setting the direction of count, wherein the direction of the signal for high speed is decided according to a direction discriminator 18 which discriminates the direction of count from output signals $a$ and $b$ of respective detectors $6a$ and $6b$, which output signals are set so as to have a phase difference of 90 electrical degrees.

The operation of this device will be explained as follows.

Figure 6:
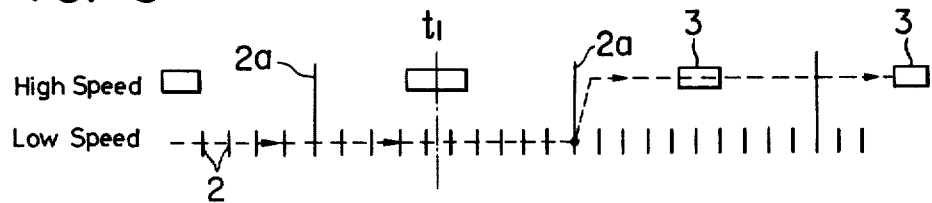
FIG. 6 and FIG. 7 are explanatory drawings illustrating the signal state at the time of switching.
Figure 7:
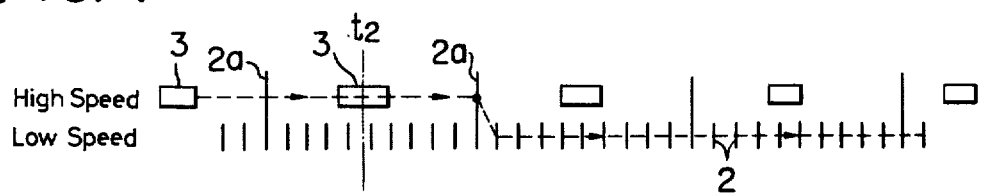

At the time of low speed displacement, the switch $S_1$ becomes ON and the switch $S_2$ OFF, and the detector $6a$ for low speed reads the fine graduations 2, providing the signals $a$ is fed to lower digit position X of the counter 16 through the switch $S_1$ to effect the count. The detector 8 for high speed reads the coarse graduations 3 whose signals $d$ are fed to higher digit position Y of the counter 16 through the switch $S_2$ to effect the count. At the time points $t_1$, $t_2$, switching from low speed to high speed or from high speed to low speed is effected, as shown in FIG. 6 and FIG. 7, wherein the dotted lines show the order of count. Namely, at the time point $t_1$, the scale bearing member 1 attains a certain present speed $V_1$. When the displacement measurement shifts from low speed to high speed, the signals $a_1$ and $a_3$ become 1 but, as the signal $c$ is 0, when the switching point is reached, the count is not changed immediately but the low speed count is continued until such time as an elongated fine graduation $2a$ and a corresponding coarse graduation 3 are detected simultaneously. As soon as detector 7 detects the next elongated graduation $2a$ and the signal $c$ becomes 1, AND member $A_2$ opens, switch $S_1$ becomes OFF and switch $S_2$ becomes ON, and the signal $d$ is fed to the higher digit position Y of the counter 16 through the switch $S_2$, shifting to the high speed counting. Thereby, skipping of the reading of fine graduations 2 is prevented from the switching time point $t_1$ until the next coarse graduation, for high speed, arrives at the reading position, whereby there is no error. When the measurement shifts from high speed to low speed and the switching time point $t_2$ is reached, the signals $a_1$, $a_3$ become 0 and the signal $a_4$ 1, while the signal $c$ is 0, so that the state of high speed counting is maintained up to a position where the signal from an elongated fine graduation $2a$ and that from a coarse graduation 3 are detected simultaneously. At that time, as soon as detector 7 detects the next succeeding elongated fine graduation $2a$ and the signal $c$ becomes 1, AND member $A_1$ opens, the switch $S_1$ becomes ON and the switch $S_2$ OFF, and the signal $a$ is fed to the lower digit position X of the counter 16 through the switch $S_1$, shifting to the count for low speed. Accordingly, skipped reading of the fine graduations is also prevented in this case.

The invention is not limited to the embodiment just described, as shown in FIGS. 2, 3 and 4, but may be used with a rotary scale bearing member as well as in a linearly displaceable scale bearing member. Furthermore, while, in the embodiment selected for specific illustration as an example, there are two successively usable scales, one with coarse graduations for effecting measurements at high speed and the other with fine graduations for effecting measurements at low speeds, a single scale could be used with a processing system utilizing interpolating pulses.

Among the various other possibilities, are the use of a scale bearing member of non-magnetic material covered with magnetic material to provide two scales having respective different pitches, the use of a scale bearing member covered with magnetic material on which is recorded a signal having one pitch with pulse measurement using electrical interpolation, with one pitch signal interpolated with a pitch signal for high speed being counted during low speed use, and the use of an optical scale having a single pitch which is interfered with by a higher order wave and, when optical interpolation is effected, the pitch of the optical scale is used for high speed measurement and the interpolated pitch, or interference fringe pitch, is used for low speed measurement.

The examples of these scales will be summarized as follows:

1. As a scale bearing member, transparent material, such as glass and the like, is covered with opaque material or reflecting material provided with two scales having respective different pitches, or with metallic material marked with two scales having respective different pitches, is detected photoelectrically, and the coarse graduations are used for measurement during high speed and the fine graduations are used for measurement during low speeds.

2. As a scale bearing member, non-magnetic material is coated with magnetic material, and two scales having respective different pitches between their graduations are recorded, with the scale having the coarse pitch being used for measurement during high speed and the scale having the finer pitch being used for measurement during low speed.

3. As a scale bearing member, non-magnetic material is coated with magnetic material, and a sine wave form is recorded with a constant pitch. This wave form is interpolated and derived as a pulse. Thereby, the measured value of the pitch of the magnetic material is used for measurement during high speed operation and the interpolated pulse is used for measurement during low speed operation.

4. As a scale bearing member, there is used a member utilizing induction. In this case, the physical scale and the pitch are used for measurement during high speed operation, and the count value of interpolated pulses is used for measurement during low speed operation.

5. As a scale bearing member, a scale is provided utilizing capacity changes having two different pitches, with the scale having the coarse pitch being used for measurement during high speed operation and the scale having the fine pitch being used for low speed operation.

6. The scale bearing member is provided with different higher order waves which are deflected from a scale having a single pitch, are interfered with by a body, and the pitch of the interference fringe and of the scale are photoelectrically measured. The count value of the interference fringe is used for measuring during low speed operation and the count value of the scale and the pitch is used for measurement during high speed operation.

Figure 8:
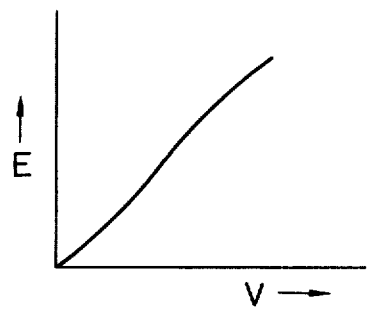
FIG. 8 and FIG. 9 are graphs showing other methods for deciding the switching speed.
Figure 9:
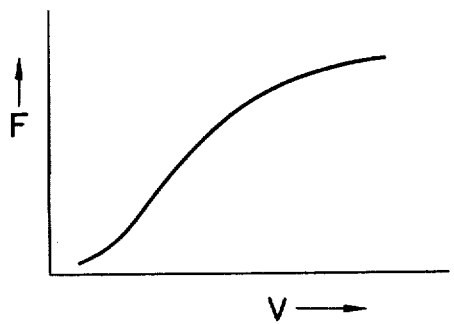

For presetting the reference speed of reference member 13, which will decide the switching between low speed use and high speed use, there are various methods. One of these is effected by providing a speed meter and utilizing the fact that speed V and speed meter output E will change as shown in FIG. 8. Another method utilizes the fact that, when a condenser or the like, made to leak under a constant state, are charged with a signal from the detector, the output F per unit time of the integrated output will change relative to the speed V as shown in FIG. 9.

As above mentioned, in the present invention, since the output signal for low speed is fed to the lower digit position in case of low speed displacement and the output signal for high speed displacement is fed to the higher digit position in case of high speed displacement, it is possible to measure high speed displacement by an element having processing capacity for low speed displacement. In accordance with another feature of the invention, the switching between high speed displacement and low speed displacement is effected only responsive to simultaneous detection of an elongated fine graduation and the correesponding coarse graduation, whereby skipped reading of fine graduations is prevented and the measurement is effected without error.

Examples of the detection of position for switching are summarized as follows:

1. One of the constant intervals is extended for use as the detection of the position for switching.

2. The graduations for detection of the position for switching are provided independently at constant intervals.

3. Optional a single pulse (1 level) among interpolated pulses is used for the detection of the position for switching.

4. The position (output) preset by the division of the coarse graduations is used for the detection of the position for switching.

5. The carry-complete signal of a counter with fine graduations is used for the detection of the position for switching.

What is claimed is:

1. A device for measuring displacement of a graduated scale, by counting its graduations moving past a detecting position, comprising, in combination, plural scales, having respective different pitches between their graduations, movable in unison past a graduation detecting position; plural graduation detector means at said graduation detecting position each operatively associated with a different respective scale; at least one of said scales having fine graduations arranged successively in groups each including the same number of fine graduations, and at least another of said scales having coarse graduations each corresponding to a respective group of said fine graduations; a counter having plural digit positions; and switching means connecting said detector means to said counter and operable, responsive to movement of said scales past said graduation detecting position at a relatively low speed, to supply, to the low digit position of said counter, input signals from the detector means operatively associated with said at least one scale, and operable, responsive to movement of said scales past said graduation detecting position at a relatively higher speed, to supply, to a higher digit position of said counter, input signals from the detector means operatively associated with said at least another of said scales.

2. A device for measuring displacement of a graduated scale, as claimed in claim 1, including scale speed detecting means operable to detect the speed of movement of said scales past said graduation detecting position; and means interconnecting said speed detecting means and said switching means and effective to control said switching means to switch the supply of input signals between said low digit position and said higher digit position of said counter responsive to detection of a change in the speed of movement of said scales between said relatively low speed and said relatively high speed.

3. A device for measuring displacement of a graduated scale, as claimed in claim 2, including control means for said switching means interposed between said speed detecting means and said switching means and operable to detect coincidence between a selected fine graduation and a corresponding coarse graduation; said control means delaying switching of said input signals between said low digit position and said higher digit position, responsive to detection of a speed change by said speed detecting means, until said control means detects such coincidence.

4. A device for measuring displacement of a graduated scale, as claimed in claim 3, in which each group of fine graduations of said at least one scale includes a distinctive fine graduation aligned with a respective coarse graduation of said at least another scale; said control means operating to switch the supply of input signals between said low digit position and said higher digit position, following detection of a speed change, responsive only to simultaneous detection of a distinctive fine graduation and the associated coarse graduation.

5. A device for measuring displacement of a graduated scale, as claimed in claim 4, in which each distinctive fine graduation is elongated relative to the other fine graduations in its respective group; said control means including a respective detector means operatively associated with said elongated fine graduations.

6. A device for measuring displacement of a graduated scale, as claimed in claim 3, including a scale bearing member; said plural scales being arranged in parallel relation on said scale bearing member.

7. A device for measuring displacement of a graduated scale, as claimed in claim 6, in which the fine graduations of said at least one scale are arranged successively in groups of ten, with one tenth fine graduation being elongated relative to the other fine graduations; said detector means including a first detector means operable to detect said fine graduations, a second detector means operable to detect said coarse graduations, and a third detector means operable to detect each tenth fine graduation; said third detector means being included in said control means.

* * * * *